United States Patent [19]

Meckler

[11] 4,296,740
[45] Oct. 27, 1981

[54] MODULAR SOLAR INSOLATION PANELS

[76] Inventor: Milton Meckler, 16348 Tupper St., Sepulveda, Calif. 91343

[21] Appl. No.: 52,434

[22] Filed: Jun. 26, 1979

Related U.S. Application Data

[63] Continuation-in-part of Ser. No. 828,773, Aug. 29, 1977, Pat. No. 4,165,036.

[51] Int. Cl.³ .................................................. F24J 3/02
[52] U.S. Cl. ..................... 126/448; 350/409; 126/440; 126/450
[58] Field of Search ............... 126/432, 440, 442, 448, 126/450, DIG. 2, 428, 449; 350/409

[56] References Cited

U.S. PATENT DOCUMENTS

| 2,316,191 | 4/1943 | Scott | 126/450 |
|---|---|---|---|
| 2,553,302 | 5/1951 | Cornwall | 126/428 |
| 3,125,091 | 3/1964 | Sleeper | 126/440 |
| 3,939,818 | 2/1976 | Hamilton | 126/449 |
| 3,965,887 | 6/1976 | Gramer | 126/450 |
| 4,051,835 | 10/1977 | Hinson-Rider | 126/440 |
| 4,055,163 | 10/1977 | Costello | 126/442 |
| 4,068,653 | 1/1978 | Bourdon | 126/440 |
| 4,092,977 | 6/1978 | Gurtler | 126/450 |
| 4,098,259 | 4/1978 | Barber | 126/450 |
| 4,133,298 | 1/1979 | Hayama | 126/448 |
| 4,138,989 | 2/1979 | Doyle | 126/450 |
| 4,148,296 | 4/1979 | Parlato | 126/442 |
| 4,178,909 | 12/1979 | Goolsby | 126/442 |
| 4,178,910 | 12/1979 | Gramer | 126/442 |
| 4,194,497 | 3/1980 | Gramer | 126/432 |

FOREIGN PATENT DOCUMENTS

| 606941 | 1/1976 | Switzerland | 126/448 |

*Primary Examiner*—Herbert F. Ross
*Attorney, Agent, or Firm*—William H. Maxwell

[57] ABSTRACT

A modular system of solar insolation panels having sun tracking capability and adapted to be installed directly upon a roof structure and integrated with the surrounding roofing, and comprised of prismatic lenses embodied in a multiplicity of transparent tubes disposed in normal relation to the traverse plane of the sun, and arranged upon an insulation panel and with corner fittings and knock-out plugs to be employed as circumstances require.

22 Claims, 7 Drawing Figures

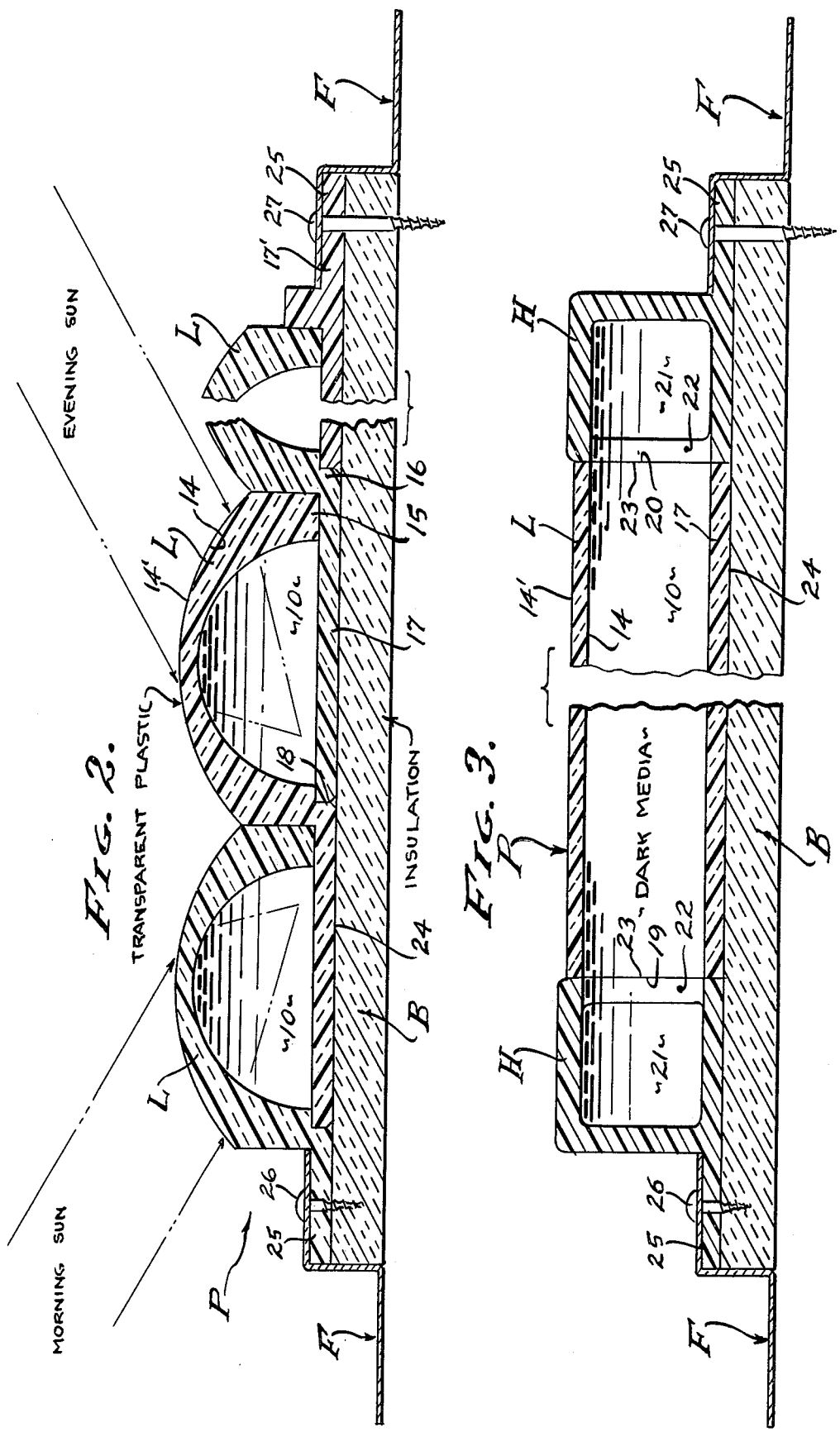

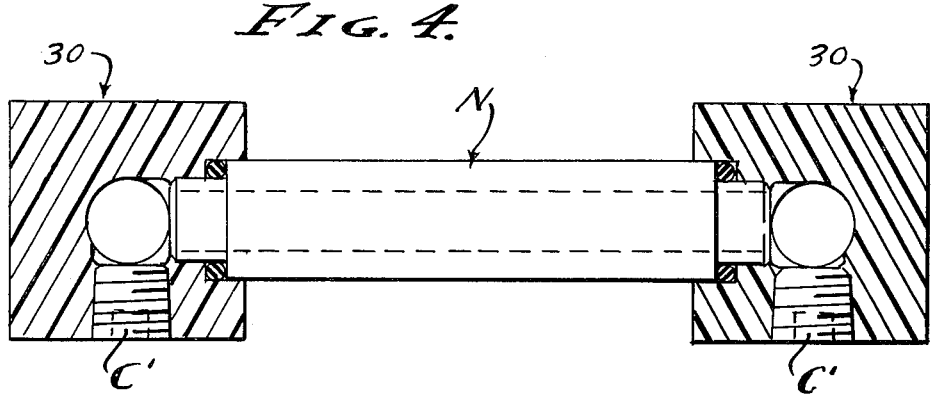
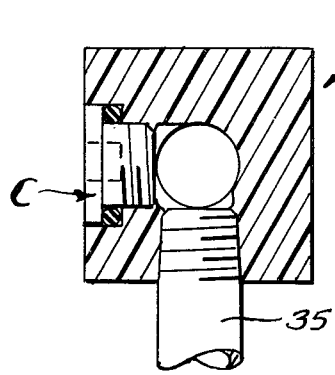
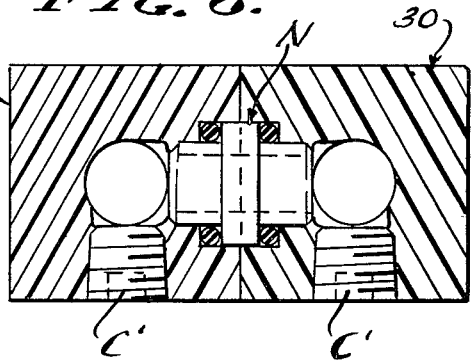
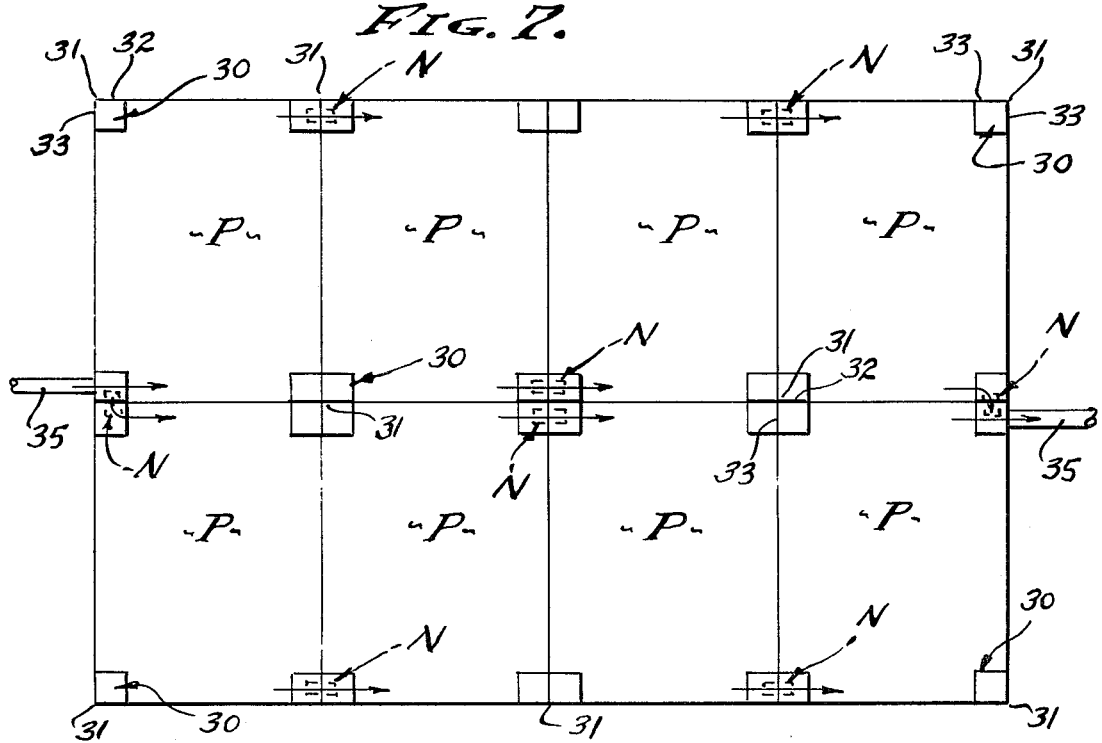

MODULAR SOLAR INSOLATION PANELS

This is a continuation-in-part of application Ser. No. 828,773 filed Aug. 29, 1977, issued Aug. 21, 1979 as U.S. Pat. No. 4,165,036.

BACKGROUND

Solar insolation can be very productive in the heating of fluids circulating through ducted panels. Although the process of insolation is quite simple, the implementation thereof becomes quite expensive in the fabrication of efficient panels therefor. For example, high conductors are ordinarily used and confined within an enclosure for the "hot house" effect, said panels must be rather expansive and therefore tend to be flimsy, and insulation must be employed to confine the collection of heat; all of which leads to considerable expense when constructing such an installation. Accordingly, it is an object of this invention to provide modular solar panels that are adapted to be assembled together in a cooperative combination whereby each panel can be lightly constructed and yet durable for handling prior to installation. Another object is to provide such panels that are complete and self sufficient to absorb the sun's radiant energy.

The installation of solar heat collectors has required field labor for the involved piping therefor, and which accounts for as much as half the cost; and to this end this invention modularizes solar panels which are complementary to each other without intermediate piping. In carrying out this invention, the panels mate one with the other with the use of interconnecting nipples that are selectively employed in place of knockouts that are removed and replaced with said nipples to establish series or parallel flow through the panels, all as circumstances require.

Heretofore, sun-tracking has been accomplished at considerable expense, involving moving parts and critical disposition of solar collector elements in the form of fluid conduction tubes. Such isolation devices can be concentrators of heat, or they can be simple flat panel collectors that rely upon a nominally acceptable alignment with the sun's traverse across the sky. For example, an austere solar panel construction involves a dark surfaced wall facing the sun and behind which a fluid media is in contact for heat absorption, and additionally a superimposed glazing that establishes a "hot house" enclosure to prevent the escape of collected heat. It is an object herein to eliminate the glazing and structure necessary to superimpose the same, and to combine the light energy penetration through the fluid conduction walls per se. In carrying out this invention, transparent highly reflective fluid conductors of low heat conductivity are employed, serving the dual purpose of maximizing heat energy penetration and confinement of heat to the fluid media conducted thereby. Further, it is an object to simultaneously track and to concentrate the sun's rays onto the fluid media, and to these ends the said fluid conductors are prismatic lenses arranged normal to the transverse plane of the sun's movement across the sky.

The installation of solar panels is conspicuous and heretofore a duplication of surfacing when applied over the roof of a building. And, a most advantages installation for a solar panel is on a roof surface facing and normal to the traverse plane of the sun. Accordingly, it is an object of this invention to provide solar insolation panels that are adapted to the building structure without duplicating the roofing, not superimposed thereon but built onto the roof as the surfacing in place of the conventional roofing. In other words, this assembly of modular solar panels is installed directly onto the rafter and sheathing structure of the building, confined within the surrounding roofing; said solar panels being installed upon a roof plane which is substantially normal to the traverse plane of the sun. A feature of these modular panels is the insulated backing thereof which secures structurally to the rafters and/or sheathing, including flashing for integration with the surrounding roofing.

It will be observed that the present invention is concerned with direct insolation of sunlight through the transparent tracking lens of the fluid conductor, and accordingly it is an object to provide efficient insolation under these conditions. A feature is the use of black or dark liquid media employed for its high heat absorption properties, and the short focal length of the prismatic tracking lens that condenses sunlight into said dark liquid media, for most efficient heat absorption. Additionally, light is reflected internally of the fluid conductors for heat absorption therefrom and into the fluid media. It is to be understood that water or a glycol solution can be the dark fluid media for superior heat absorption properties.

SUMMARY OF THE INVENTION

This invention relates to a low cost solar panel installation for effective insolation and the least conspicuousness. The panel installation can be augmented as required and integrated into the roof of a building, without special construction and as a replacement of the roofing area, upon which it is installed. Prismatic lens tracking is a feature attributed to the fixed installation, utilizing parallel lens members disposed substantially normal to the plane of the sun's traverse, and having a short focal length for condensing the light rays into the fluid media conducted within the lens. It will be observed that the focal point moves within the cross sectional area of the fluid media channel, and preferably a dark fluid media having high heat absorption properties. The multiplicity of lens members joined between parallel headers is backed by an insulating structural panel and secured thereto by perimeter flashing providing for coupled engagement of adjoining panels and their integration into the surrounding roofing.

The foregoing and other various objects and features of this invention will be apparent and fully understood from the following detailed description of the typical preferred forms and applications thereof, throughout which description reference is made to the accompanying drawings.

DESCRIPTION OF THE DRAWINGS

FIG. 2 is an enlarged detailed longitudinal sectional view taken as indicated by line 2—2 on FIG. 1.

FIG. 3 is an enlarged detailed transverse sectional view taken as indicated by line 3—3 on FIG. 1.

FIGS. 4 and 5 are enlarged fragmentary sectional views taken as indicated by lines 4—4 and 5—5 on FIG. 1.

FIG. 6 is a view similar to FIG. 4 showing the adjacently engaged condition of the corner fittings, and FIG. 7 is a diagrammatic view showing a typical arrangement of modular panels as they are interconnected by the nipples shown in FIG. 6 and with the plugs as shown in FIG. 5 utilized and removed as indicated.

PREFERRED EMBODIMENT

Figure 1:
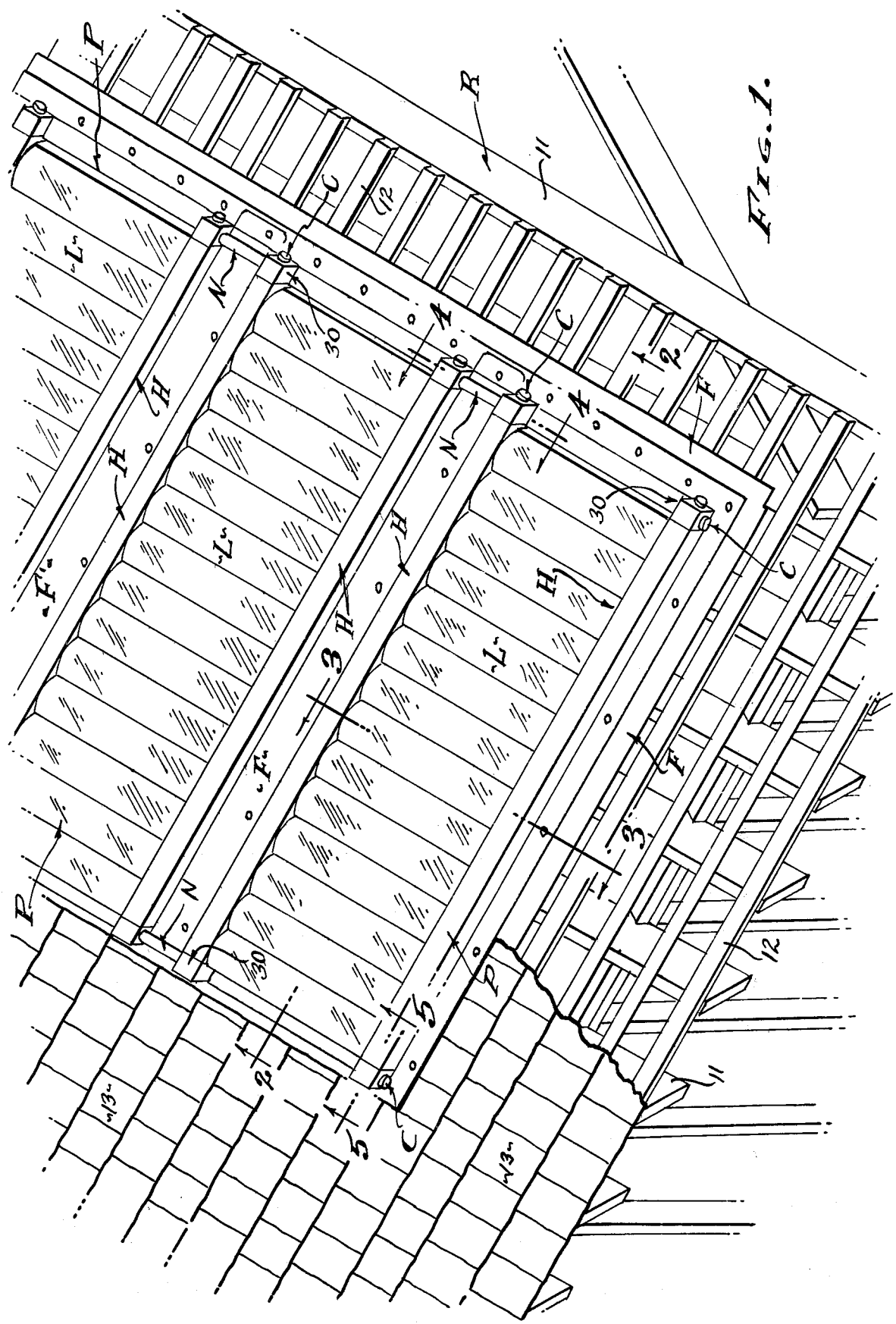
FIG. 1 is a perspective view of a building structure with a portion of the roofing broken away and illustrating the installation of a plurality of insolation panels of the present invention.

Refering now to the drawings, there are solar insolation panels P comprised of a multiplicity of lens member L joined together in side by side relation to form media conducting channels 10 extending between headers H. Accordingly, there is a cooperative assembly of members L and headers H, made of plastic material welded together into an integral unit, and all of which is supported upon an insulating backing member B. Securement of the lens-header assembly to the backing is by means of a perimeter flashing F that provides for the integration of the panel P with the underlying and surrounding roof structure R. A feature of the panels P is the closure plug C and adapted nipple N that provide for a cooperative arrangement of a plurality of panels P, to augment an installation thereof as circumstances require.

The insolation panel P is a modular assembly of rectangular configuration adapted to be installed as a roofing surface, or in place of the usual roofing such as shingles. Accordingly, the drawings illustrate a plurality of panels P installed upon a roof structure R comprised of rafters 11 with overlying sheathing 12 and surrounded by shingles 13. Note that the backing B is secured to the sheathing 12 and the flashing underlies and overlies the shingles 13 as in common practice to shead water. In carrying out this invention's installation of the panels P is end to end and side by side as shown, upon a roof plane disposed substantially normal to the traverse plane of the sun's movement across the sky. Therefore, the lens members L are what I will term upwardly disposed as they are inclined up the roof R from the eave to the ridge, and extending between horizontally disposed headers H one elevated above the other. Thus, the sun's rays remain substantially normal to the lens axes throughout traverse between sunrise and sunset. However, it is to be understood that the effective part of the day is sometime after sunrise and before sunset.

The lens members L can be fabricated in various ways, either as a single part or as separate parts. However, it is the multiplicity of parallel lenses which characterizes this invention, and it is preferred that the lenses are individual members arranged side by side in parallel relation. Further, a feature is the direct contact of fluid media within the lenses and the fluid conducting channels thereof into which the lenses are formed. Accordingly, the lenses are made of a transparent material preferably a plastic of low heat conductivity such as acrylic that can be cast in an open sided configuration, to be laid together as shown with one complementing the other to form the channel 10. As shown therefore, each prismatic lens member L is preferably a cast acrylic plastic body comprised of an upwardly crowned lens wall having an interior 14 of lesser concavity than an exterior 14' of greater convexity. Therefore, the lens L is concavo-convex and of elongated prismatic form. The lens wall forms a bridge that extends between opposite side rails 15 and 16 of male and female form adapted to nest one into the other. Thus, the male rail 15 of one lens member is received in the female rail 16 of the next adjacent lens member, and so on to an extent as may be required.

The fluid media channels 10 are formed by an underlying wall 17 extending from the female rail 16 of one lens member and beneath the convex lens opening to engage in a rabbet groove 18 in the next adjacent lens member. It is this underlying wall 17 that closes the fluid media channel 10 within the multiplicity of prismatic lenses. Additionally, the wall extends to the left side as shown, to form a securement flange at the left margin of the assembly, in which case a separate right hand margin member 17' is formed for securement at the opposite end of the assembly, as shown, to form a complementary securement flange.

The assembly of prismatic lenses L and member 18 are solvent welded so as to form an integral body of parallel semi cylindrical prism-lenses. The integral assembly is characteristically rectangular in plan configuration with the multiplicity of fluid media channels opening at opposite parallel sides 19 and 20. The sides 19 and 20 are arranged or dressed off normal to the transverse or axial dispositions of the lens members, to receive the header H next described.

The headers H are alike, one to be applied to each of the sides 19 and 20 or by means of solvent welding so as to become integral therewith. As shown, the header cross section is extruded acrylic plastic having a tube form with a passage 21 therethrough and manifold openings 22 into each channel 10. Joinder of the header H to the sides 19 and 20 is planar, the header having a flat face 23 coextensive with the side 19 or 20 for welding thereto with solvent. The lowermost wall of the header is extended to form a securement flange, and it will be observed that the finished assembly of prismatic lenses L and headers H presents a flat planar bottom 24 characterized by marginal flanges 25.

The backing member B is provided for its insulating and structural properties, to underly the above described lens and header assembly L-H. Accordingly, the backing member B is of rectangular configuration coextensive with the bottom 24 and its perimeter flanges 25. In practice, the backing is made of particle board or the like, a flat panel of substantial thickness with right angularly related normal edges. The backing member B is relatively stiff and is adapted to receive and to pass fasteners for mounting the lens and header assembly L-H and to install the same onto the roof structure R rafters 11 and/or sheathing 12.

Mounting of the lens and header assembly L-H and securement thereof to the building roof structure is by means of the flashing F that integrates the same with the surrounding roofing or shingles 13. The flashing F is of sheet metal joggled to extend along and overlie the flanges 25 at the sides of the insolation panel P and to cooperate with the adjoining roofing shingles 13. Accordingly, the flashing F at those sides of the panels P that adjoin the roofing shingles 13 are joggled to extend beneath or over the adjacent shingles. However, those sides of the panels P that adjoin other panels P are adjoined by flat butt strap flashing F'. That is, the edges of flanges 25 which butt are coupled together by overlying strap flashing F', as shown. In practice, there are short fasteners 26 that enter through the flashing F and F' and into the backing B to secure the lens and header assembly L-H to the backing B, and there are long fasteners 27 that enter through the flashing F and F' and through the backing B to install the panel P in its entirety. The fasteners 27 enter into the roof rafters 11 or sheathing 12.

Referring now to the modularity of the insolation panels P, said panels are adapted to interengage one with the other, in side by side, end to end, and corner to corner relation, with fluid connection established between the headers H thereof, either in a series of parallel relation with respect to flow through said panels. As best illustrated in FIG. 1, the opposite end of each header H is closed by a fitting 30 with a corner 31 at or coincidental (see FIG. 7) with a corner of the backing member B, said fittings being in open fluid communication with the header tube passages 21 as shown in FIG. 3 and open at the exterior of the two right angularly related sides 32 and 33 that form the panel corner 31 (see FIGS. 1 and 5), at each corner of the insolation panel P. In practice, the exterior openings are threaded and sealed with O rings to receive a closure plug C as shown in FIG. 5, or to receive a fluid transmission nipple N as shown in FIGS. 4 and 6, whereby fluid transmission through the headers H is selective. Accordingly, the plugs P can be retained or replaced with nipples N, as clearly detailed in FIGS. 4 and 6; and as shown in FIG. 7 the selection of header flow can be as circumstances require, for example the series flow through a multiplicity of panels arranged in parallel. The nipples N are slideably received in the fitting openings and sealed with the O-rings as shown. Additionally and as shown in FIG. 6 the bottom of the fittings 30 is closed by a removeable pipe plug C' or the like and adapted to receive inlet and outlet plumbing 35 extended through the backing B and into the roof structure as shown in FIG. 5. It is to be understood that an infinite number of interconnection and arrangements can be attained with the selection of plugs C and/or nipples N applied to the corner fittings 30, as indicated.

From the foregoing, it will be seen that a roof structure extenting from East to West can be pitched so that the upwardly disposed prismatic lenses L are substantially normal to the plane of the sun's traverse across the sky. It is to be understood that this normality will vary with the seasons, but some variation in this respect does not defeat the tracking capability of the prismatic lens L and fluid channel 10 therein. Note that the concavo-convex relationship is such that the focal length of the lens is short, and such as to focus within the cross sectional area of the channel 10, and this is so throughout a wide range of the sun's traverse, for example between mid morning and mid afternoon. Specifically, the morning sun will align with the left side of the lens L and focus to the right of the channel 10; while the afternoon sun will align with the right side of the lens L and focus to the left of the channel 10. Obviously, the noon sun at its zenith aligns centrally of the lens L and focuses to the bottom of the channel 10. A feature of the invention is the use of highly reflective transparent material in the formation of the lens L, and a material that has high first surface reflection properties. Said reflective properties of the ducted lens is significant, in that internal reflections in the channel 10 redirects the sunlight through the fluid media and increases insolation efficiency. The number of parts is basically few to make up the lens-header L-H assemblies, and to mount the same upon the insolation structure backing B. Temporary securement is by means of the short fasteners 26 while permanent installation is by means of the long fasteners 27. Any side by side and end to end arrangement of solar panels can be made, spaced as shown in FIG. 1 or engaged as shown in FIG. 7, and the circulation of fluid media therethrough determined by remving knock-outs or plugs C and inserting nipples N as shown to direct the dark fluid media as it is pumped or permitted to flow by convection.

As is shown, the panels P are arranged in corner to corner relation, with the flashing F and F' secured to adjacent panel flange 25 and to the underlying roof structure. Original roof installation is of course to be desired, with completion of the roofing surrounding this panel installation. However, retrofit installation is feasable by positioning the backing B and overlying lens-header L-H following which the flashing F and F' is tucked into the roofing shingles as circumstances require. It is then a simple matter to plumb the corner fittings 30 to piping 35 that transports the fluid media for useful purposes.

Having described only a typical preferred form and application of my invention, I do not wish to be limited or restricted to the specific details herein set forth, but wish to reserve to myself any modifications or variatons that may appear to those skilled in the art as set forth within the limits of the following claims:

I claim:

1. A solar insolation panel for installation upon an inclined roof plane substantially normal to the plane of the sun's traverse across the sky, and including; a multiplicity of transparent light focusing tubes disposed in substantially normal relation to the traverse plane of the sun and extending between spaced headers and open therethrough for the transport of fluid media therein, the transport tubes having elongated prismatic lens walls exposed to the sun's rays and focused to condense the sun's rays into the fluid media within the tubes to absorb heat during the sun's traverse across the sky, and a structural backing of insulation material underlying the tubes mounted thereto and secured to the roof.

2. The solar insolation panel as set forth in claim 1, wherein the prismatic lens walls are of concavo-convex form exposed to the sun's rays and focused into the fluid media within the tubes during said traverse across the sky.

3. The solar insolation panel as set forth in claim 1, wherein the prismatic lens walls are of concavo-convex form and of short focal length focusing the sun's rays into the fluid media within the tubes during said traverse across the sky.

4. A solar insolation panel for installation upon an inclined roof plane substantially normal to the plane of the sun's traverse across the sky, and including; an assembly of members of transparent material laid adjacent one to the other in substantially nornal relation to the traverse plane of the sun across the sky and each comprising an upwardly crowned prismatic lens wall exposed to the sun's rays and focused to condense the sun's rays into a fluid media contained within a channel formed by said lens wall extending between spaced and parallel male and female rails and forming said fluid media channel therebetween, there being an extension from a rail of one member to underlie and close the channel of the next adjacent member, spaced headers with manifold openings into the channels of said members for the transport of fluid media absorbing heat therein, and means integrally joining the assembly of members and headers.

5. The solar insolation panel as set forth in claim 4, wherein the assembly of members are coextensive to planar sides having flat joinder planes with the headers.

6. The solar insolation panel as set forth in claim 4, wherein the assembly of members are coextensive to planar sides having flat joinder planes with the headers, and wherein integral joining of the assembly is by means of solvent welding.

7. The solar insolation panel as set forth in claim 4, wherein the said rail extension of one member forms a mounting flange.

8. The solar insolation panel as set forth in claim 4, wherein the said rail extension of one of said members forms a mounting flange at one margin, and wherein another of said members closes the channel and forms a mounting flange at the opposite margin.

9. The solar insolation panel as set forth in claim 4, wherein the headers have marginal extensions forming opposite mounting flanges.

10. The solar insolation panel as set forth in claim 4, wherein the said rail extension of one of said members forms a mounting flange at one margin, and wherein another of said members closes the channel and forms a mounting flange at the opposite margin, and wherein the headers have marginal extensions forming opposite mounting flanges.

11. The solar insolation panel as set forth in claim 4, wherein a structural backing of insulation material underlies the assembly of members and headers and is adapted to securement to the roof.

12. The solar insolation panel as set forth in claim 4, wherein the said rail extension of one of said members forms a mounting flange at one margin, wherein another of said members closes the channel and forms a mounting flange at the opposite margin, wherein the headers have marginal extensions forming opposite mounting flanges, and wherein a structural backing of insulation material underlies the assembly of members and headers and is adapted to securement to the roof.

13. The solar insolation panel as set forth in claim 4, wherein a structural backing of insulation material underlies the assembly of members and headers and is adapted to securement to the roof, wherein the said rail extension of one member forms a mounting flange overlying the structural backing, and wherein rigid flashing overlies said mounting flange and structural backing to stengthen the same and extends into the surrounding roofing to integrate therewith.

14. The solar insolation panel as set forth in claim 4, wherein a structural backing of insulation material underlies the assembly of members and headers and is adapted to securement to the roof, wherein the said rial extension of one of said members forms a mounting flange overlying the structural backing at one margin, wherein another of said members closes the channel and forms a mounting flange overlying the structural backing at the opposite margin, and wherein rigid flashing overlies said mounting flanges and structural backing to strengthen the same and extends into the surrounding roofing to integrate therewith.

15. The solar insolation panel as set forth in claim 4, wherein a structural backing of insulation material underlies the assembly of members and headers and is adapted to securement to the roof, wherein the headers have marginal extensions forming opposite mounting flanges overlying the structural backing, and wherein rigid flashing overlies said mounting flanges and structural backing to strengthen the same and extends into the surrounding roofing to integrate therewith.

16. The solar insolation panel as set forth in claim 4, wherein a structural backing of insulation material underlies the assembly of members and headers and is adapted to securement to the roof, wherein the said rail extension of one of said members forms a mounting flange overlying the structural backing at one margin, wherein another of said members closes the channel and forms a mounting flange overlying the structural backing at the opposite margin, wherein the headers have marginal extensions forming opposite mounting flanges overlying the structural backing, and wherein rigid perimeter flashing overlies said mounting flanges and structural backing to strengthen the same and extends into the surrounding rooofing to integrate therewith.

17. Modular solar insolation panels for installation upon an inclined roof plane substantially normal to the plane of the sun's traverse across the sky, and including an assembly of a multiplicity of transparent tubes disposed in substantially normal relation to the traverse plane of the sun and extending between spaced headers and open therethrough for the transport of fluid media absorbing heat therein, a fitting in communication with the headers at each corner of the assembly and having liquid openings exposed through adjacent sides of each corner fitting, and there being plugs closing said openings and replaced by nipples to establish flow as circumstances require.

18. The modular panels for the collection of solar heat as set forth in claim 17, wherein the corner fittings of the panels are selectively unpluged and plumbed with inlet and outlet piping.

19. The modular panels for the collection of solar heat as set forth in claim 17, wherein the panels are juxtaposed side by side with the corner fittings at said side spaced one from the other with the said openings thereof in alignment and the said plugs removeable and replaceable with the said nipples extending therebetween for fluid communication.

20. The modular panels for the collection of solar heat as set forth in claim 17, wherein the panels are juxtaposed side by side and end to end with the corner fittings at said side and ends spaced one from the other with the said openings thereof in alignment and the said plugs removeable and replaceable with the said nipples extending therebetween for fluid communication.

21. The modular panels for the collection of solar heat as set forth in claim 17, wherein the panels are engageable side by side with the corner fittings at said side engageable one against the other with the said openings thereof in alignment and the said plugs removeable and replaceable with the said nipples extending therebetween for fluid communication.

22. The modular panels for the collection of solar heat as set forth in claim 17, wherein the panels are engageable side by side and end to end with the corner fittings at said side and ends engageable one against the other with the said openings thereof in alignment and the said plugs removeable and replaceable with the said nipples extending therebetween for fluid communication.

* * * * *